(12) United States Patent
Ivanov et al.

(10) Patent No.: US 10,367,821 B2
(45) Date of Patent: *Jul. 30, 2019

(54) DATA DRIVEN ROLE BASED SECURITY

(71) Applicant: Microsoft Technology Licensing, LLC, Redmond, WA (US)

(72) Inventors: Sergei Ivanov, Issaquah, WA (US); John August Barrows, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 219 days.

This patent is subject to a terminal disclaimer.

(21) Appl. No.: 15/384,675

(22) Filed: Dec. 20, 2016

(65) Prior Publication Data

US 2017/0111367 A1     Apr. 20, 2017

Related U.S. Application Data

(63) Continuation of application No. 14/457,045, filed on Aug. 11, 2014, now Pat. No. 9,537,863, which is a (Continued)

(51) Int. Cl.
*H04L 29/06* (2006.01)
*G06F 21/00* (2013.01)
(Continued)

(52) U.S. Cl.
CPC .......... *H04L 63/105* (2013.01); *G06F 21/604* (2013.01); *G06F 21/6218* (2013.01); (Continued)

(58) Field of Classification Search
CPC ....... H04L 63/10; H04L 63/08; H04L 63/101; G06F 21/604; G06F 21/6218; G06F 2221/2141
See application file for complete search history.

(56) References Cited

U.S. PATENT DOCUMENTS 5,564,016 A    10/1996  Korenshtein
6,289,458 B1    9/2001  Garg et al.
(Continued)

FOREIGN PATENT DOCUMENTS

CN        1537262 A       10/2004
WO     2008118803 A1      10/2008

OTHER PUBLICATIONS

"Non-Final Office Action Issued in U.S. Appl. No. 12/774,108", dated Aug. 15, 2012, 6 Pages.
(Continued)

*Primary Examiner* — Lisa C Lewis
(74) *Attorney, Agent, or Firm* — Ray Quinney & Nebeker, PC; Thomas M. Hardman; Timothy J. Churna

(57) ABSTRACT

Aspects extend to methods, systems, and computer program products for controlling performance of a requested user operation. It is determined if a requested user operation can access data on behalf of a user based on an obtained user context associated with the user. The user context identifies the location of an object representing a user relative to other objects within a hierarchical data structure. The context is used to derive a role for the user. A control expression is accessed. The control expression governs access of the requested user operation for the derived role. A set of permissions is formed for the user by evaluating the control expression using the user context and a data context for the data. The user's authorization to perform the requested user operation is determined from the set of permissions. The requested user operation is performed according to the determined user's authorization.

28 Claims, 13 Drawing Sheets

Related U.S. Application Data continuation of application No. 12/774,108, filed on May 5, 2010, now Pat. No. 8,806,578.

(51) Int. Cl.
  *G06F 21/62* (2013.01)
  *G06F 21/60* (2013.01)

(52) U.S. Cl.
  CPC .............. *H04L 63/08* (2013.01); *H04L 63/10* (2013.01); *H04L 63/101* (2013.01); *G06F 2221/2141* (2013.01)

(56) References Cited

U.S. PATENT DOCUMENTS

| | | | | |
|---|---|---|---|---|
| 6,295,605 | B1* | 9/2001 | Dockter | G06F 21/6218 713/166 |
| 7,140,035 | B1 | 11/2006 | Karch | |
| 7,685,123 | B1 | 3/2010 | Thompson et al. | |
| 8,099,767 | B2* | 1/2012 | Alberti | H04L 63/102 713/168 |
| 2002/0188611 | A1 | 12/2002 | Smalley et al. | |
| 2002/0188616 | A1 | 12/2002 | Chinnici et al. | |
| 2003/0014394 | A1 | 1/2003 | Fujiwara et al. | |
| 2003/0149714 | A1* | 8/2003 | Casati | G06Q 10/10 718/100 |
| 2003/0229623 | A1* | 12/2003 | Chang | G06F 21/6218 |
| 2005/0273346 | A1* | 12/2005 | Frost | G06Q 30/00 705/316 |
| 2005/0278790 | A1* | 12/2005 | Birk | G06F 21/54 726/26 |
| 2006/0133615 | A1* | 6/2006 | Bade | G06F 21/33 380/277 |
| 2006/0230432 | A1 | 10/2006 | Lee et al. | |
| 2007/0112772 | A1 | 5/2007 | Morgan et al. | |
| 2007/0162501 | A1* | 7/2007 | Agassi | G06Q 30/02 |
| 2007/0239514 | A1* | 10/2007 | Lissy | G06Q 10/06 705/7.13 |
| 2008/0016580 | A1 | 1/2008 | Dixit et al. | |
| 2008/0244723 | A1* | 10/2008 | Brewster | H04L 63/0227 726/11 |
| 2008/0263009 | A1* | 10/2008 | Buettner | G06F 17/30979 |
| 2009/0019516 | A1 | 1/2009 | Hammoutene et al. | |
| 2009/0164267 | A1* | 6/2009 | Banatwala | G06F 17/30997 707/736 |
| 2009/0300544 | A1 | 12/2009 | Psenka et al. | |
| 2011/0022812 | A1* | 1/2011 | van der Linden | G06F 9/5077 711/163 |
| 2011/0184962 | A1* | 7/2011 | Palmer | G06Q 10/10 707/754 |
| 2011/0213789 | A1* | 9/2011 | Doshi | G06F 21/6218 707/754 |
| 2012/0017269 | A1* | 1/2012 | Cahill | G06Q 10/10 726/9 |

OTHER PUBLICATIONS

"Non-Final Office Action Issued in U.S. Appl. No. 12/774,108", dated Aug. 28, 2013, 14 Pages.

"Notice of Allowance Issued in U.S. Appl. No. 12/774,108", dated Apr. 2, 2014, 7 Pages.

"Final Office Action Issued in U.S. Appl. No. 14/457,045", dated May 25, 2016, 6 Pages.

"Non-Final Office Action Issued in U.S. Appl. No. 14/457,045", dated Dec. 15, 2015, 11 Pages.

"Notice of Allowance Issued in U.S. Appl. No. 14/457,045", dated Aug. 23, 2016, 8 Pages.

"First Office Action and Search Report Issued in Chinese Patent Application No. 201110122748.5", dated Dec. 3, 2014, 14 Pages.

Thion, et al., "Data Dependencies for Access Control Policies", In Proceedings of the International Workshop on Logic in Databases, Oct. 29, 2009, pp. 71-84.

"Second Office Action Issued in Chinese Patent Application No. 201110122748.5", dated May 21, 2015, 7 Pages.

Groba, et al., "Context-Dependent Access Control for Contextual Information", In Second International Conference on Availability, Reliability and Security, Apr. 10, 2007, pp. 155-161.

Purevjii, et al., "A Unified Framework for Evaluating Data-Dependent Access Control Systems", In IPSJ Digital Courier, vol. 2, Jan. 2006, 11 Pages.

Ramaswamy, et al., "Role-Based Access Control Features in Commercial Database Management Systems", In Proceedings of 21st National Information Systems Security Conference, Oct. 5, 1998, 9 Pages.

Scholten, Hans, "Context Based Access Control: An Approach for Implementing RBAC and Beyond", In Business Whitepaper, 2007, 22 Pages.

Smith, Harry E., "A Context-Based Access Control Model for HIPAA Privacy and Security Compliance", In SANS Security Essentials, Version v1.2e, Jul. 18, 2001, 17 Pages.

"Notice of Allowance Issued in Chinese Patent Application No. 201110122748.5", dated Sep. 8, 2015, 4 Pages.

\* cited by examiner

DATA DRIVEN ROLE BASED SECURITY

CROSS REFERENCE TO RELATED APPLICATIONS

This application is a continuation of and claims the benefit of and priority to U.S. patent application Ser. No. 14/457,045, entitled "Data Driven Role Based Security", filed Aug. 11, 2014 by Sergei Ivanov et al., the entire contents of which are expressly incorporated by reference. That application is a continuation of and claims the benefit of and priority to U.S. patent application Ser. No. 12/774,108, now U.S. Pat. No. 8,806,578, entitled "Data Driven Role Based Security", filed May 5, 2010 by Sergei Ivanov et al., the entire contents of which are expressly incorporated by reference.

BACKGROUND

By way of background concerning some conventional systems, access to data resources and/or operations of a protected system via an access control system has traditionally been achieved by assigning one or more access privileges to one or more users of the protected system. In this regard, conventional role based access control (RBAC) techniques enable a user to access protected system resources based on a role assigned to the user. As such, the user is permitted to access and/or perform operations on the protected system based on one or more access privileges assigned to the role. For example, protected system operations (in this case a storage system being the protected system) such as "create storage volume" and "delete storage volume" can be assigned to an "administrator" role. When the user is assigned the administrator role, the user can create and/or delete any storage volume included in the storage system.

RBAC is thus an approach to restricting system, or system resource, access to authorized users based roles and permissions defined for the roles. Within an organization, roles are created for various job functions, such as manager or administrator. The permissions to perform certain operations are assigned to specific roles. Members of staff or other system users are assigned particular roles, and through those role assignments, those user(s) acquire the permissions to perform particular system functions. Since users are not assigned permissions directly, but through their role (or roles), management of individual user rights becomes a matter of assigning appropriate users to appropriate roles. Typically, a role is represented as an identifier (role name or ID) and a list of role member IDs, e.g., users or groups stored as security identifiers (SIDs) in Windows-based systems or user entity names in Unix-based systems.

To supplement the role assignments, in a conventional access control list (ACL) model, objects or resources can be assigned a set of role IDs that describe the effective set of users for which access to the objects or resources can be granted. Typically, in operation, based on the user context of a user making a request for an operation or a resource, i.e., based on what roles the user is allowed to assume, and based on what permission set those roles resolve according to the access control list (ACL) enforced over a given object or resource being accessed, the system makes a determination of whether the action being taken by the given user is permitted. In this regard, both the set of roles that a user can assume and the set of permissions defined over an object for given roles are purely declarative and therefore statically defined. While this is generally sufficient for a system or a hierarchy of resources of a known extent and scale, when the number of users and types of roles and relationships between them become non-trivial, or change frequently, statically defining the access permissions and user roles and keeping them up to date and consistent with changing resources and resource hierarchies can present a burdensome security configuration management challenge.

In this regard, traditional access control administration models are based on objects whereby access control is specified at the object or object container (for example, in an ACL), and typically an administrator or other authorized entity specifies permissions granted to the object. Administrators thus translate the organizational authorization policy into permissions on objects: Each object has a list of access permissions that is granted to roles representing various users and groups within an organization. Compared to the situation of having to define custom code for controlling permissions for a given data system, RBAC simplifies access control administration and increases manageability in enterprise environments by allowing permissions to be managed in terms of user job functions.

Some of the goals of role-based access control can be accomplished using groups. A group corresponds to an employee role, and application administrators can specify the permissions that are needed by the role by granting the group permission in an ACL for the object. As object collections grow, however, the number of places where administrators manage permissions grows. Diligent use of resource groups and user groups can help minimize this effort, but this requires consistent practice and coordination among administrators and precise definitions of resource groups. These processes slow down the administrative process, so administrators often avoid use of groups.

Additionally, querying the granted access to a particular group or role across an application becomes more difficult as the number of objects grows. For example, to accurately determine what permissions are granted to a user or group, administrators generally examine the permissions on every object. Since there are too many objects to query, the state of access control with respect to a particular group or user can be difficult to verify. Moreover, where more than non-trivial changes occur to an organization's resource hierarchy, such as, for example, when a human resources information management system records employee transfer to a different department, updates may be required to both the affected user objects and to any applicable ACLs, and failure to do so, can result in incorrect access permissions or an undefined state of the system. Specifically, these difficulties are due to permissions being explicitly assigned in the ACL without regard to extended properties of the protected resource.

The above-described deficiencies of today's role based security systems are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

Examples extend to methods, systems, and computer program products for controlling performance of a requested user operation. It is determined if a requested user operation can access data on behalf of a user based on an obtained user context associated with the user. The user context identifies the location of an object representing a user relative to other objects within a hierarchical data structure. The context is used to derive a role for the user. A control expression is accessed. The control expression governs access of the requested user operation for the derived role.

A set of permissions is formed for the user by evaluating the control expression using the user context and a data context for the data. The user's authorization to perform the requested user operation is determined from the set of permissions. The requested user operation is performed according to the determined user's authorization.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Various non-limiting embodiments are further described with reference to the accompanying drawings in which.

DETAILED DESCRIPTION

Overview

Figure 1:
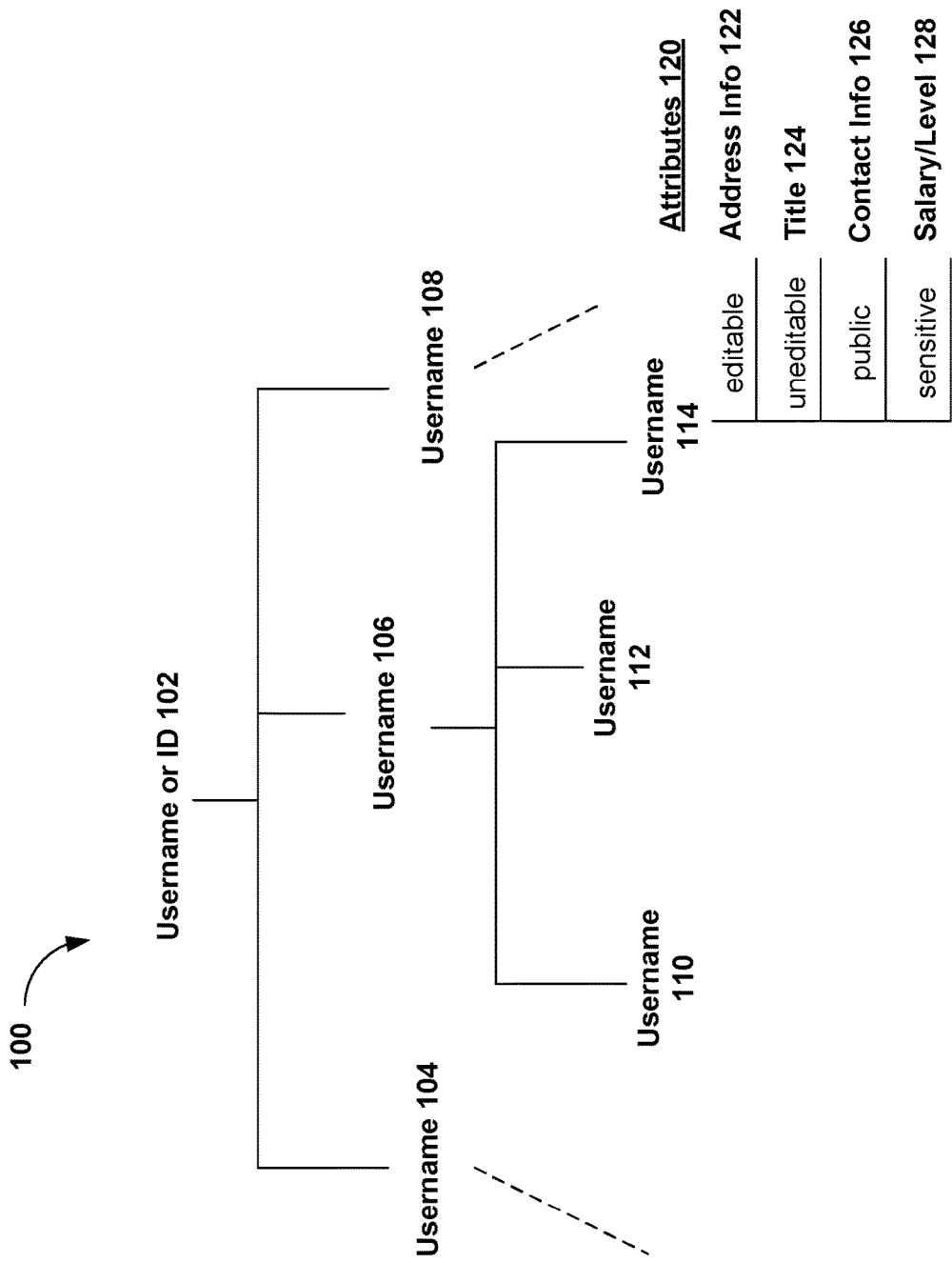
FIG. 1 is a block diagram of an illustrative example of a role based security system employing a tree to represent data objects and attributes.

As discussed in the background, role-based access control allows administrators to specify access control in terms of the organizational structure of a company by creating objects called roles. Users are assigned to roles to perform associated job functions. Roles define the authorization permissions on set(s) of resources. In the RBAC model, the administrator uses the role to manage permissions and assignments. For example, a company may create a role called Sales Manager that has the permissions that a sales manager needs for their job. When sales managers are hired, they are assigned the Sales Manager role and instantly have the permissions for that job as a result. When they leave the position of sales manager, they are removed from the Sales Manager role and no longer have Sales Manager access. Since the role allows access to be granted in terms of a company's organizational model, RBAC is an intuitive way for administrators to specify access control.

In brief, RBAC maps user roles to application permissions so that access control administration can be accomplished in terms of a user's roles. The RBAC system then translates a user's role membership to application permissions. Since the permissions are granted via the role, permissions can be queried and changed via the role without examining the specific resources.

However, as alluded to in the background, the reality of complex organizations is that data dependencies develop among roles such that a role for a user that applies at one time, which might result in grant of permission for editing a given resource at that time, will, at a different time, result in denial of access for editing that given resource. For instance, for a human resources application that tracks employee information, each employee in turn has a manager, who in turn has a manager, who in turn has a manager—and so on—with the sequence terminating with the top level employee, e.g., the founder of the company. Thus, while the term "manager" as a role has meaning, and along with that manager role come certain permissions, such permissions are with respect to those who are managed by that manager, but not with respect to all employees.

Thus, when an individual changes sub-organizations within a company, more changes in terms of permissions structure than that individual's permissions. In particular, permissions structure changes for that individual's manager, and depending on where the people previously managed by that individual end up in the organizational structure as a result of that individual's shift to the difference sub-organization, their permissions and roles may have changed as well. These changes should thus also be propagated to the ACLs that govern access to the various appropriate resources for people of the organization to ensure that individual no longer has access to certain former resources to which that individual had access, and to ensure that individual has access to certain new resources appropriate for the new position in the hierarchy. If these changes are not made, incorrect permissions will result, or worse, the system may enter into an undefined state, from which it may be difficult to recover.

Further details of these and other various exemplary, non-limiting embodiments and scenarios are provided below.

Data Driven Role Based Access

As mentioned, in the context of role based permissions, complex hierarchies for the underlying data can introduce a significant burden where there is significant reorganization of the hierarchy, and data dependencies that are affected as a result of such reorganization. More generally, for any application for which security depends not only on who the individual is that is requesting permission, but also on other underlying data that may change frequently, the updates in individual information and associated ACLs can be a significant burden on administrators of the system to ensure the correct permission structure is enforced over the application.

As an illustrative example, FIG. 1 shows a human resources application that tracks a company's worldwide employees and employee attributes, as represented by a tree structure 100. While FIG. 1 is illustrated with a relatively small number of employees, it can be appreciated that some of the world's largest companies have tens or hundreds of thousands of employees, and thus, the example is for simplicity of conceptual illustration, but not intended to undermine the complexity or burden introduced by the problems that can result in administration of large numbers of data objects having inter object dependencies. As depicted, top level employee has user (e.g., username or ID) 102, followed by users 104, 106 and 108 that report to user 102. Users 104 and 108 in turn have their reporting employees (not shown), and user 106 has users 110, 112 and 114 reporting to user 106. In this regard, the user objects possess certain attributes 120 that may be applicable to the given application, here, a human resource application as an example. For instance, attributes 120 may include address information 122 (e.g., home address), title information 124 (e.g., product unit manager), contact information 126 (e.g., phone number or email address) or salary/level information 128.

In this regard, some of these attributes 120 may be editable by user 114 directly, such as home address information 122. Some of them may not be editable, however, such as title information 124. Some information may be public to all or a subset of all, such as contact information 126. Other information may be private to all but a select few individuals, such as salary/level information 128. For instance, it may be the case that only a manager of user 114, namely user 106 or user 102, can change the title information 124 associated with user 114.

On the ACL side, to implement these kinds of permissions, e.g., who can view and who cannot view, who can authorize changes or make changes and who cannot, etc., the ACL associated with user 114 will specify what roles can edit the title, change the salary, etc. However, the problem with roles in such a large organization is that the role "manager" has a different meaning for different employees since most employees have a different manager. And thus, specific managers will be specified in the ACL for a given user object, such as user 114, namely users 106 and 102 in FIG. 1, whereas user 108 even though above user 114 will not be able to change user 114's title information 124 since user 108 is not user 114's manager.

Figure 2:
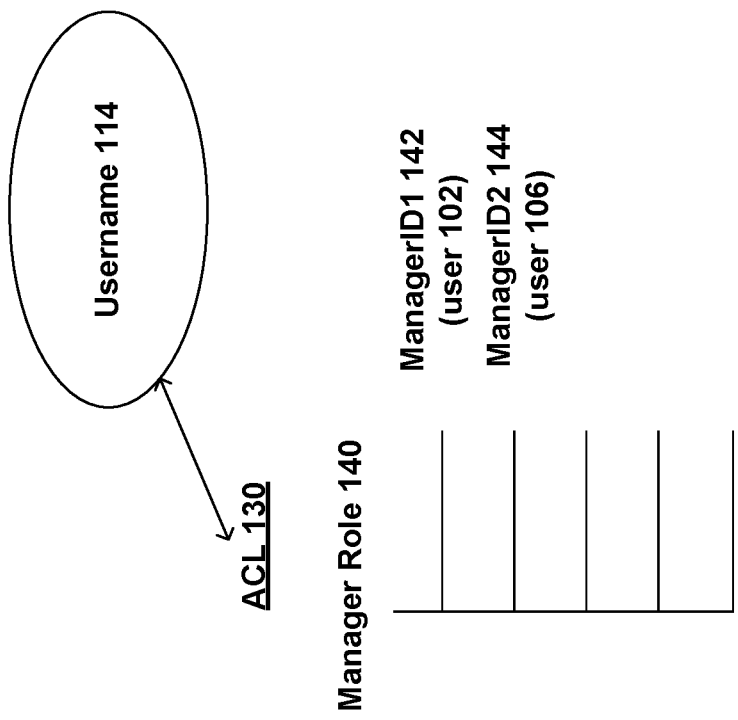
FIG. 2 is a block diagram of an illustrative example of an access control object that can be employed in connection with securing the data objects of FIG. 1.

To illustrate, FIG. 2 illustrates an object associated with user 114, i.e., the data that represents user 114 and the attributes 120. In this regard, to implement security with an ACL, ACL 130 includes a list of roles and permissions for those roles. As mentioned, since the manager role 140 by itself is not enough information to determine if a given user has permission to change the title information associated with user 114, the manager IDs that do have permission are enumerated in the ACL 130, e.g., user 102 (e.g., managerID1 142) and user 106 (e.g., managerID2 144) are both identified as having permission to edit the title or perform other actions on user 114 since they are veritable managers of user 114. Any manager not listed in the ACL 130 for user 114 will not be able to act in the capacity of manager with respect to user 114.

Figure 3:
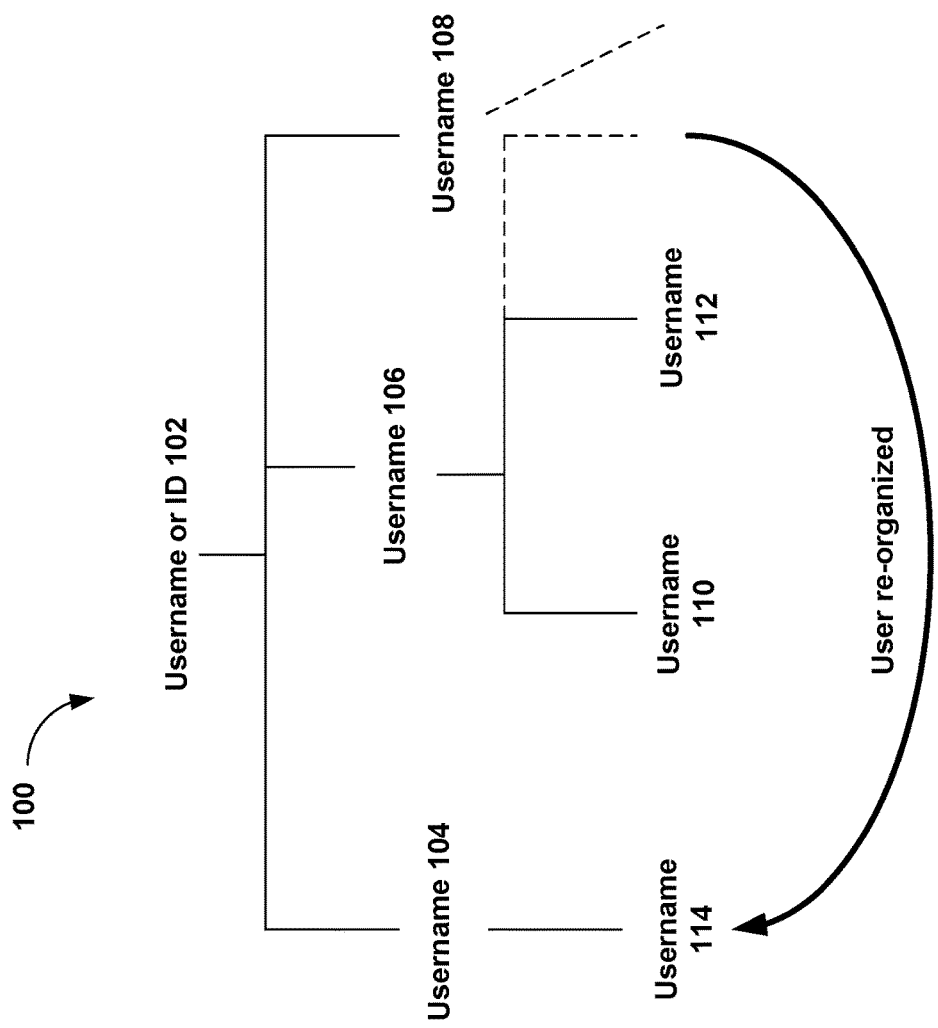
FIG. 3 is a block diagram of the illustrative example of FIG. 1 in which an employee is re-organized to a different part of the organization and corresponding consequences.
Figure 4:
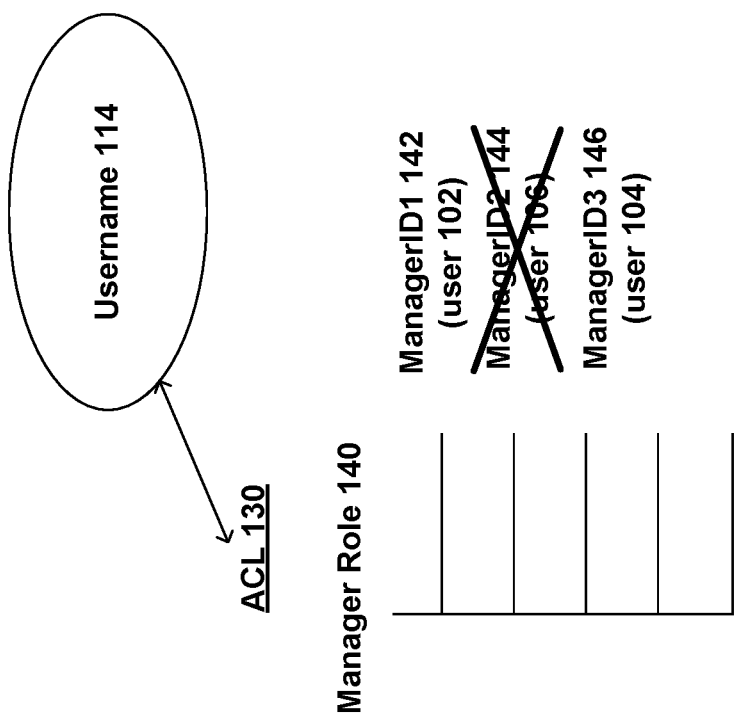
FIG. 4 is a block diagram of changes that are made to the access control object of FIG. 2 based on the re-organization of the employee illustrated in FIG. 3.

As mentioned, an issue presents itself when user 114 (or any user) switches to a difference part of the tree structure 100, e.g., is re-organized from one sub-group of the company to another sub-group, such as from one product group to another. The move of the employee from one part of the tree structure 100 to another part by itself is relatively straightforward. In such case, once the move is authorized and as illustrated in FIG. 3, an administrator re-positions the user 114 from one part of the tree structure 100 to another. However, this move in the tree structure 100 does not change the security settings associated with the object representing user 114. As illustrated in FIG. 4, such a re-organization will also be accompanied by a manual change of ACL(s) associated with user 114. For instance, the managerIDs associated with the manager role 140 defining which managers are capable of carrying out a manager role with respect to user 114, are to change if an updated permission set is desirable. Specifically, user 106 is no longer user 114's manager and thus user 106 will be deleted from ACL 130 and managerID3 146 representing user 104 is added to the list of managerIDs defining who can act in the manager role with respect to such individual.

If this type of event happened once in awhile, or if the tree is relatively small, the administrative overhead stays relatively low. However, if the tree is large or if movement occurs frequently, or if the set of permissions that can be granted over an object via an ACL is large and complex, the administrative burden can be overwhelming. In addition, if an administrator fails to update the ACLs properly, or makes a mistake in doing so, the security system can be prone to error in granting permission, or reach an unstable state where other dependencies are broken, or become circular.

Accordingly, in various non-limiting embodiments, a role based system is provided that is data driven. Specifically, control expressions can be provided instead of, or in addition to, explicit IDs in the ACLs, which are evaluated based on a current data context for the user, thereby greatly simplifying the design of complex security requirements where a single role cannot be generalized for all members assuming functions of that role. While in the past, systems have used customized application code to handle evaluation of complex security expressions, such systems take time to design and, if security requirements change frequently, then updating the custom application code each time implicates significant development and maintenance costs. If such custom application code contains logical or programming errors, security can inadvertently be compromised, or system down time may be incurred. Thus, the ability to drive security access decisions as a function of underlying data in a programmatic way apart from the application itself is beneficial.

Thus, in various embodiments, a data driven mechanism for role-based security is provided enabling role-based access control using data itself as input for access control decisions. In certain suitable applications, concepts that are context-dependent and that ordinarily cannot be mapped to a list of users in a context-free manner can be represented as security roles. Some non-limiting benefits over existing methods are reduced overhead surrounding permissions management and more direct expression of access control intent.

As mentioned, conventional methods of access control are reliant on a set of static permission grants, maintained separate from the data set, authorizing a set of users, groups or roles to access certain data elements. While generalizable, in cases where the structure of protected data set is descriptive enough to inform access control, e.g., Manager can modify Employee.Salary, the user is Manager if User.ID=Employee.ManagerID, it is useful to be able to express access control intent in formulaic fashion. By contrast, conventional role based security processes enforce that each individual manager in the organization be granted the permission to modify salaries of their direct reports.

Using a data driven mechanism in accordance with various embodiments described herein therefore provides a way to express access control policy with respect to the structures defined in the protected data set. Then, a one-time, expression-like security role definition, such as the definition of Manager above, can be employed for access control without ever designating a specific set of user identities as members of Manager Role. Additional detail and examples are discussed below in connection with the implementation of data-dependent roles, data-dependent role membership determination and data-dependent permission evaluation.

In one embodiment, the data driven mechanism for data security comprises two parts. A first part is a new kind of security role within the general framework of role-based access control, which can be referred to as a derived role (DROL) since a DROL serves to express roles that are populated not by explicit enumeration of user IDs, but rather defined by some aspect of data context in which they occur. A second part is a modification to the access control procedure, which can be referred to as data-dependent role access control (DRAC). DRAC applies when the user attempting to access a data element has a permission grant on that data element resolving through a DROL. A mechanism including these two parts can be implemented standalone or as an augmentation to an ordinary role-based access control system.

As mentioned, a conventional security role is identified by a name and/or ID and has a list of members. For DROLs on the other hand, membership is dynamically determined, e.g., as follows. DROLs have three application-defined parameters, Associated Entity, Member Query, and Control Expression. In one embodiment, when a user is authenticated and has role memberships determined, first, useful aspects of the user authentication token are captured, e.g. textual user name and binary SID, and any available application-level identifying information. Next, a member query is executed against an associated entity furnishing the elements from the previous step as query variables. Next, if the query has returned an entity, role membership is affirmed and the returned entity is saved in the user context as role context for subsequent use in the DRAC procedure.

The DRAC procedure is used to evaluate whether a permission grant resolving through a DROL is to be honored at runtime. The data element, or control context, is evaluated against role context according to control expression(s) specified in the DROL. In one embodiment, control context and role context are treated as object-type variables for the purposes of such evaluation. Permission grant is then honored if the control expression evaluates to True. If not, the permission grant is ignored.

Figure 5:
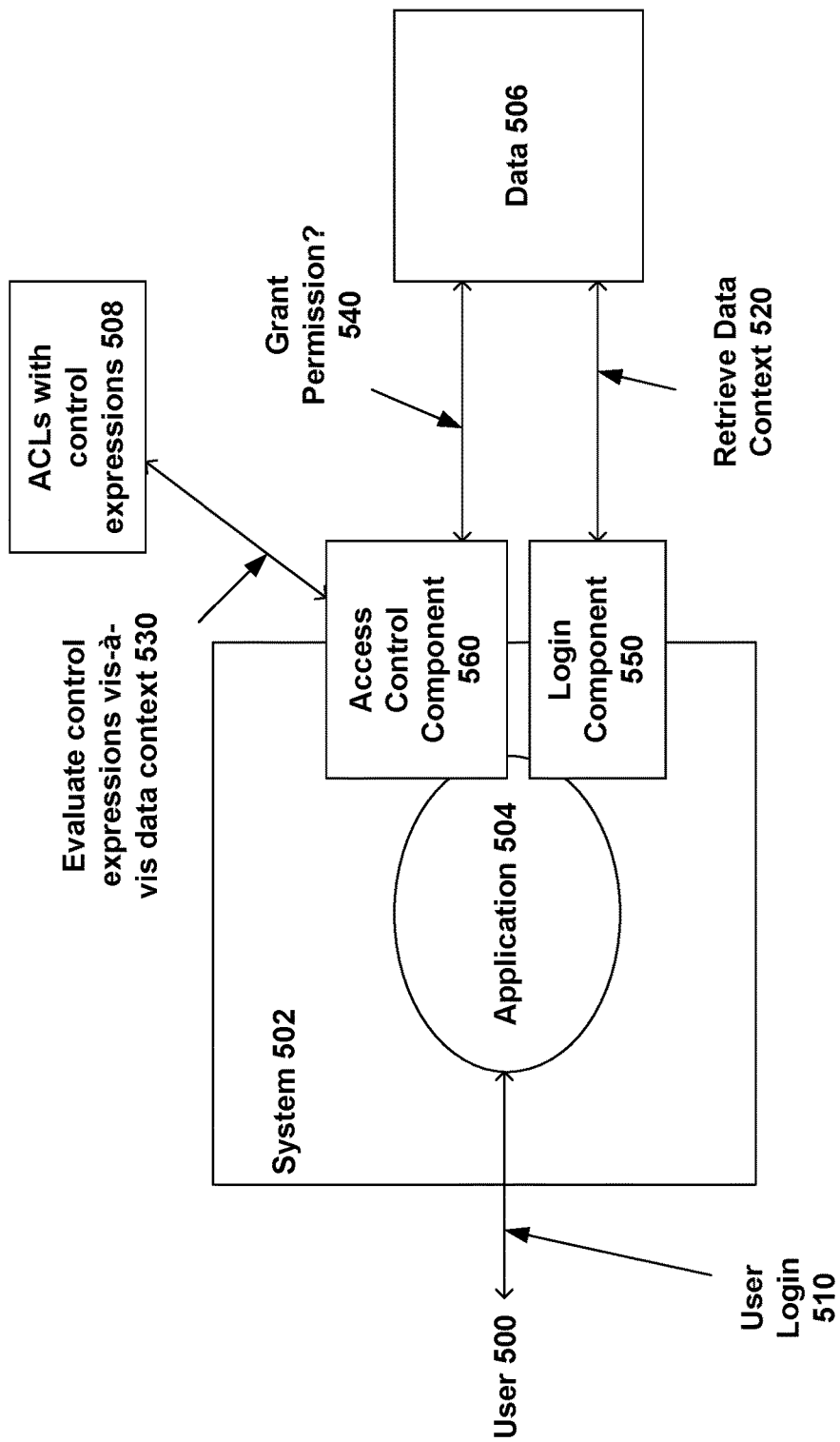
FIG. 5 is a system diagram illustrating a non-limiting embodiment of data driven role based security.

FIG. 5 is a system block diagram illustrating a non-limiting embodiment of data driven role based security including control expressions in ACLs 508 for dynamic evaluation. In this regard, a user 500 logs in at 510 to an application 504 of a system 502. It can be appreciated that the DRAC techniques described herein can be implemented at a system level as well as an application level. For conceptual illustration, the description herein applies to an example of employee-based data, but similar techniques can be applied to objects of a file system, or anywhere it is desirable to restrict access to objects based on dynamic roles. At login, a login component 550 retrieves a data context 520 applicable to the use of application 504 by user 500. For instance, the login component can query for the data context in response to receiving a login based on user credentials identifying the user. Accordingly, when user 500 makes a request for data 506, access control component 560 dynamically evaluates control expressions of ACLs 508 relative to the data context 520 to determine if permission can be granted at 540 for the given user request. For instance, access control component 560 can dynamically evaluate a programmatic expression against current versions of the data objects.

Figure 6:
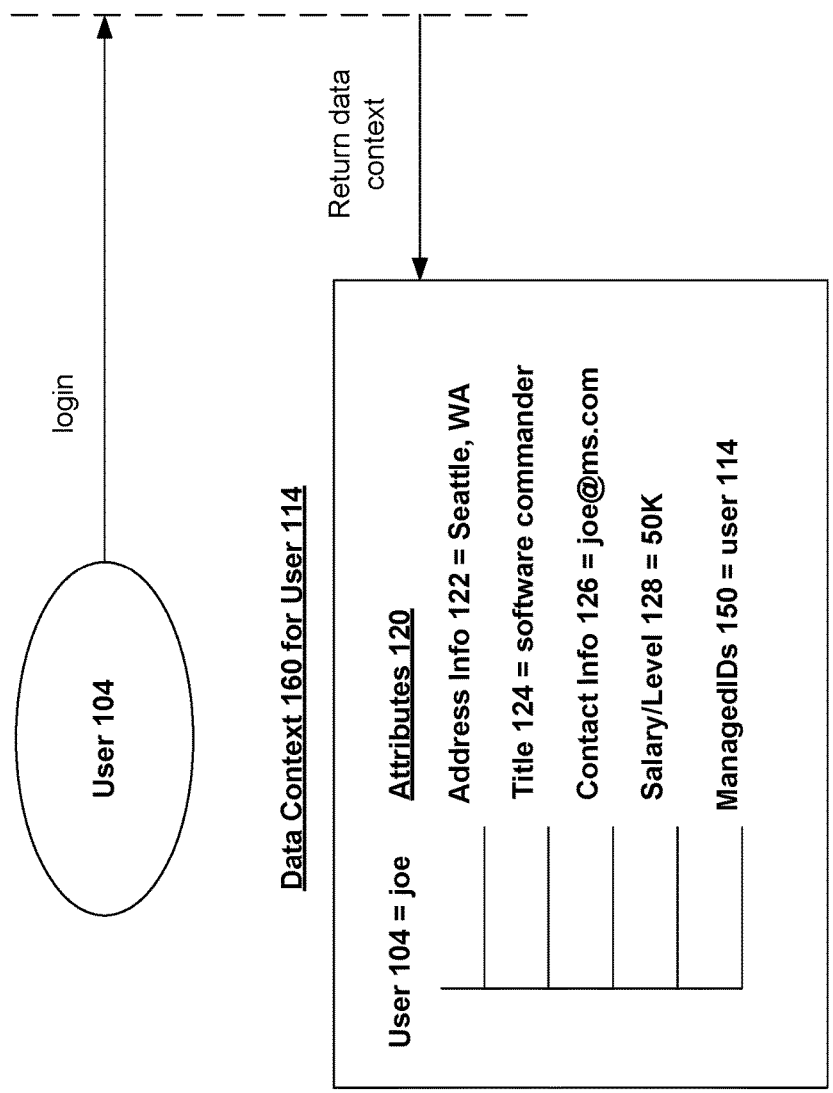
FIG. 6 is a block diagram showing the retrieval of a data context upon user login in accordance with an aspect of data driven role based security.

FIG. 6 is a block diagram showing the retrieval of a data context upon user login in accordance with an aspect of data driven role based security. To illustrate data driven role based security in the context of the example discussed earlier in connection with FIGS. 1-4, consider the point at which user 114 has been re-organized under user 104 instead of user 106. As mentioned, since security settings do not auto-update when the position of user 104 in the tree changes, in accordance with an embodiment, when user 104 logs in to the application, a query automatically returns data context for user 104. In this regard, any of attributes 120 can be returned as instances of data for the data context 160 for user 104. For instance, an attribute 120 may include managedIDs 150 listing those who are managed by the individual, such as user 114 (or this information could be extracted by examining the tree structure applying to the organizational chart). In the present example, it is assumed that the system/application would like to determine who user 104's direct reports are, since user 104 wishes to make a change to the title of one of the employees. As a result of the real-time retrieval of up to date information, in this case, it is determined as part of the data context 160 that user 104 has user 114 as a direct report as part of the re-organization by examining managedIDs 150.

Figure 7:
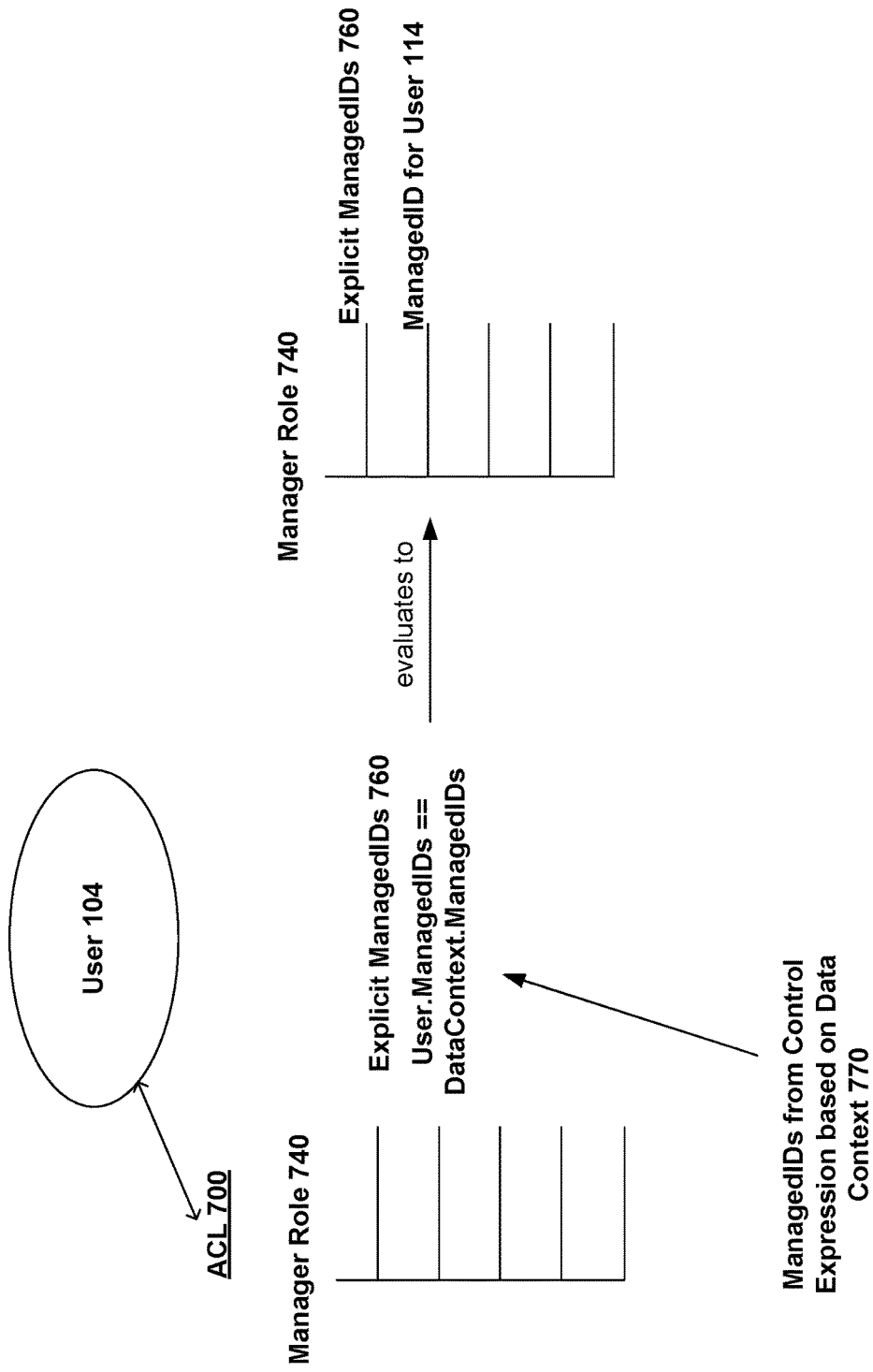
FIG. 7 is a block diagram illustrating an example evaluation of a control expression in an access control object in accordance with an embodiment of data driven role based security.

FIG. 7 is a block diagram illustrating an example evaluation of a control expression in an access control object in accordance with an embodiment of data driven role based security. In this regard, as mentioned, the change of position of user 114 does not automatically change the associated ACLs for user 104 or user 114. In the present example, thus, an ACL 700 is defined including a DROL, e.g., manager role 740, which can optionally include some explicit managedIDs 760 (e.g., those specifically enumerated as direct reports for user 104) and may also include managedIDs 770 from control expression(s) which are derived dynamically from the data context retrieved according to the exemplary process of FIG. 6. Upon dynamic evaluation vis-à-vis the data context, it is determined that user 114 is in fact one of user 104's direct reports and thus any operation permitted as a manager will be permitted according to such role.

Figure 8:
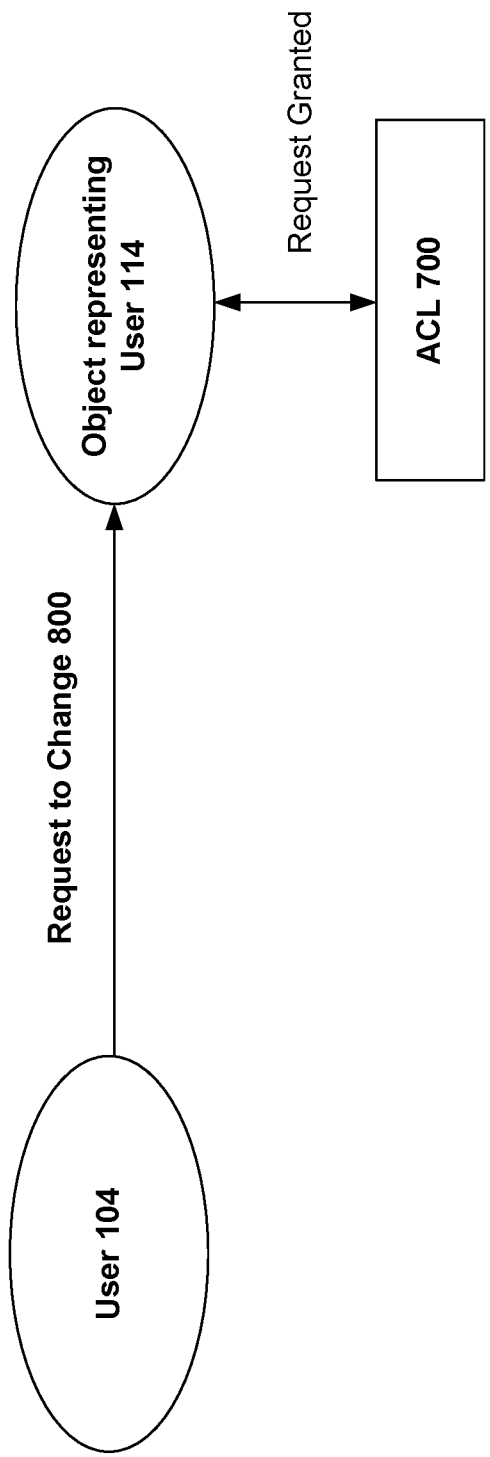
FIG. 8 is a block diagram illustrating the grant (or denial) of access based on the set of permissions of an access control object derived from an evaluation of a control expression of the access control object.

FIG. 8 is a block diagram illustrating the grant (or denial) of access based on the set of permissions of an access control object derived from an evaluation of a control expression of the access control object. In this regard, according to the example of FIGS. 6-7, if user 104 requests a change 800 to the object representing user 114, based on the dynamic evaluation of the control expression in ACL 700, the request will be granted assuming that the item being changed in the object is within the province of a manager role.

Figure 9:
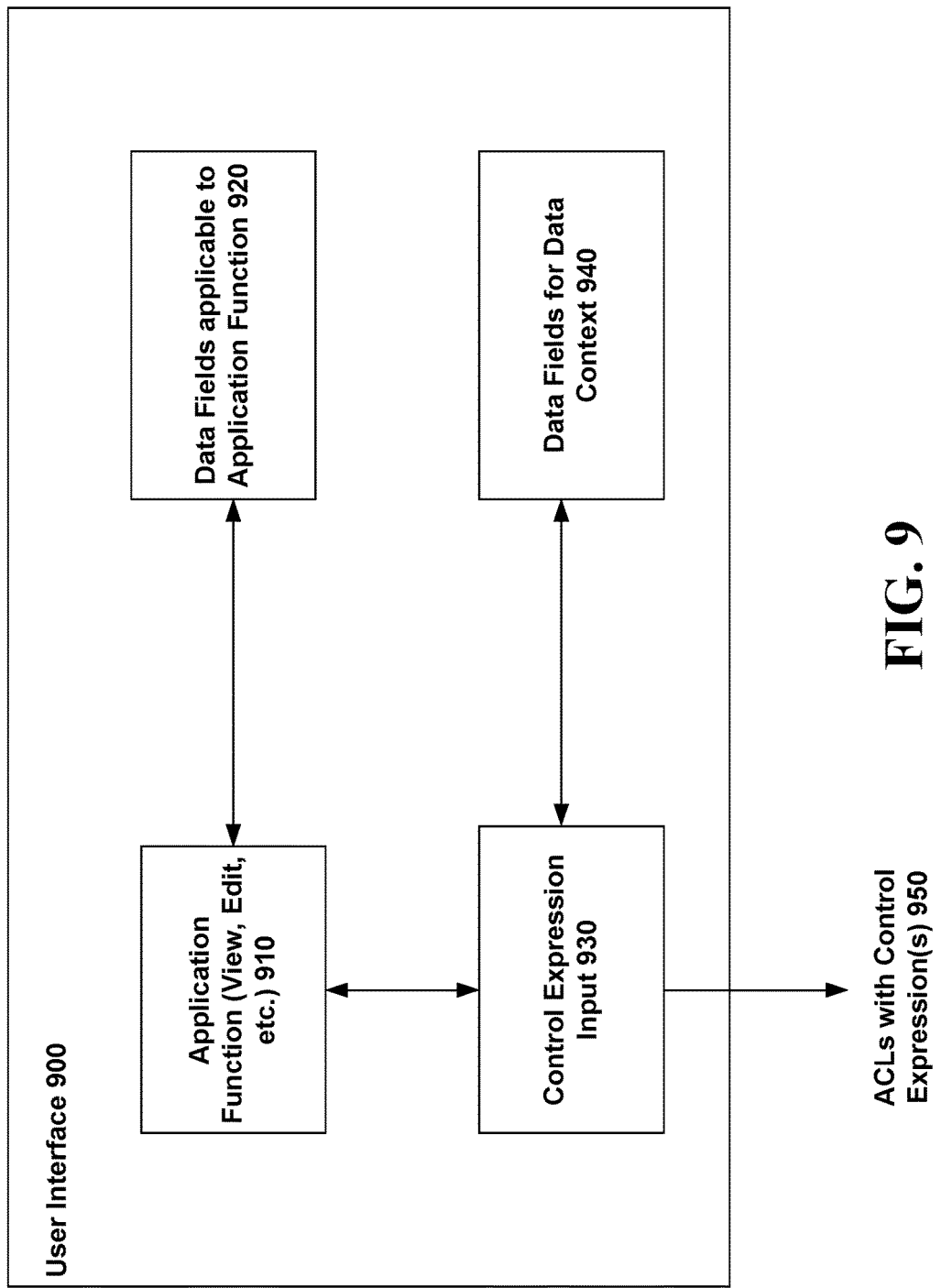
FIG. 9 is a block diagram of an exemplary, non-limiting user interface for defining control expressions for use in connection with access control objects to achieve data driven role based security.

FIG. 9 is a block diagram of an exemplary, non-limiting user interface for defining control expressions for use in connection with access control objects to achieve data driven role based security. As such, the tool illustrated having user interface 900 is but one example of a tool for creating control expressions for defining dynamic roles as described above, and should not be considered limiting. For instance, via a simple UI for a given role such as manager, a user of the tool could select a function 910 of a given application, e.g., edit, view, print, distribute, etc., and also input which data fields 920 are applicable to the application function. For instance, in the above example, the managedID data field will be relevant to the ability to change in the manager role. Next, data fields 940 that are to be retrieved as instances as part of the data context when a user logs in to the application are also selected. Based on these pieces, a control expression can be formed by control expression input component 930, e.g., by specifying a Boolean expression that resolves to true when the role conditions are met by the data context. As a result, such control expression(s) can be output for use in role based access control objects by a data driven role based security system, such as output for use as ACLs with such control expressions 950.

Figure 10:
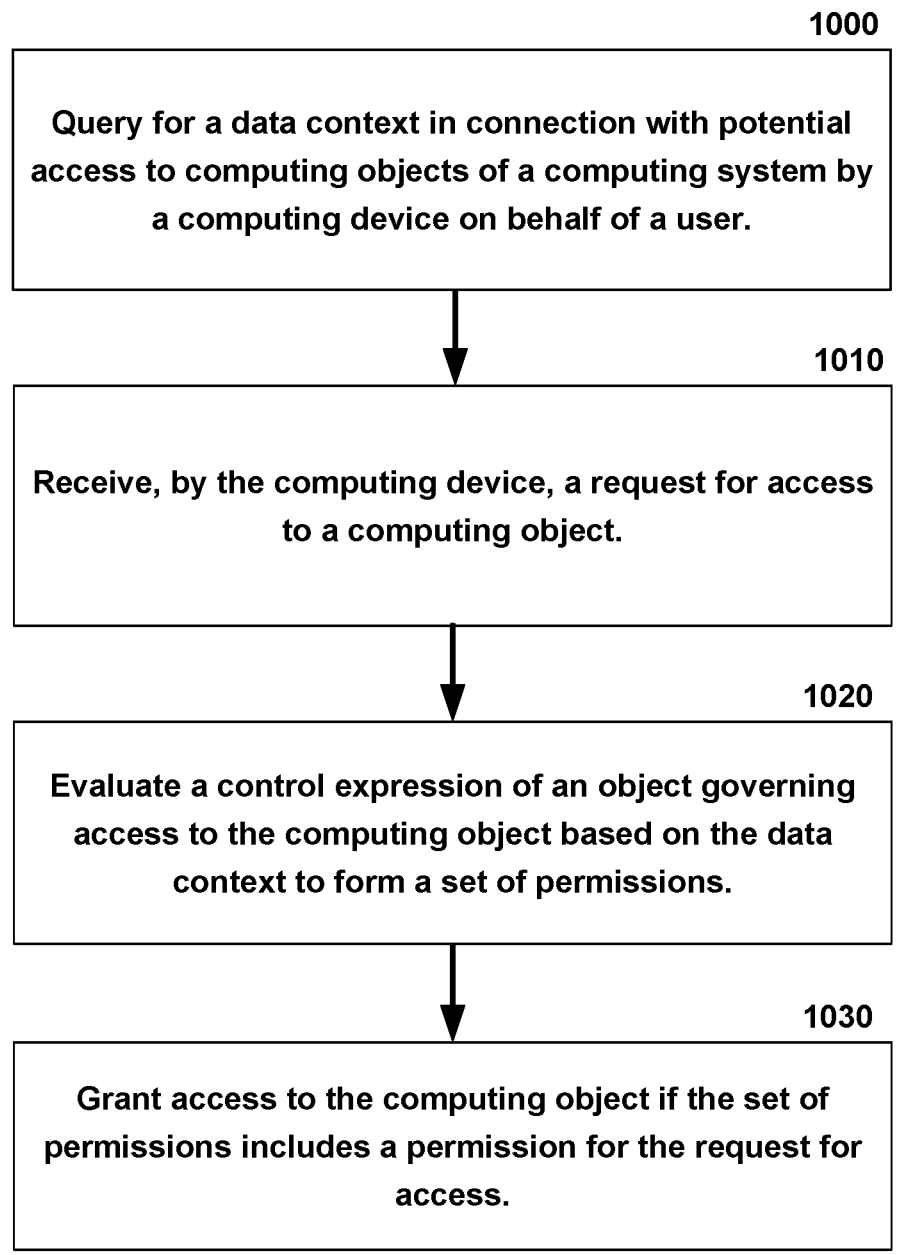
FIG. 10 is a flow diagram of an exemplary, non-limiting process for data driven role based security in accordance with an embodiment.

FIG. 10 is a flow diagram of an exemplary, non-limiting process for data driven role based security in accordance with an embodiment. At 1000, the system queries for a data context in connection with potential access to computing objects of a computing system by a computing device on behalf of a user identity. For instance the querying can include querying for the data context in response to receiving a login based on credentials identifying the user identity. At 1010, the computing device receives a request for access to a computing object. At 1020, a control expression of an object governing access to the computing object is dynamically evaluated based on the data context to form a set of permissions. The evaluating can include evaluating a programmatic expression against one or more current versions of the one or more computing objects. At 1030, access to the computing object is granted if the set of permissions includes a permission for the request for access.

Figure 11:
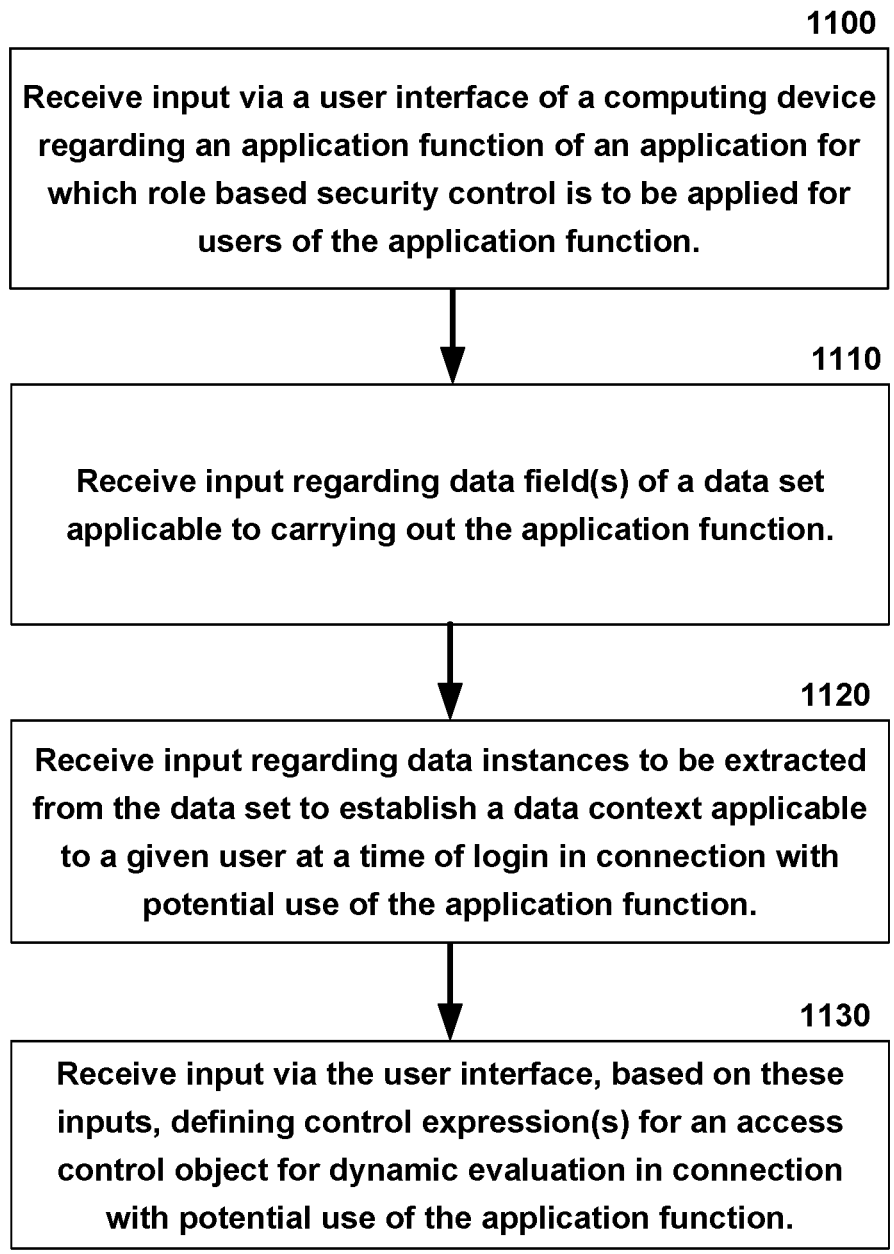
FIG. 11 is a flow diagram of another exemplary, non-limiting process for data driven role based security in accordance with an embodiment.

FIG. 11 is a flow diagram of another exemplary, non-limiting process for data driven role based security in accordance with an embodiment. At 1100, input is received via a user interface of a computing device regarding an application function of an application for which role based security control is to be applied for users of the application function. At 1110, further input is received regarding data field(s) of a data set applicable to carrying out the application function. At 1120, input is received regarding data instances to be extracted from the data set to establish a data context applicable to a given user at a time of login in connection with potential use of the application function. At 1130, additional input is received via the user interface, based on the various inputs, that defines control expression(s) for an access control object for dynamic evaluation in connection with potential use of the application function by different users and determining their permissions in connection with a data driven role based security system according to one or more embodiments described herein.

Exemplary Networked and Distributed Environments

One of ordinary skill in the art can appreciate that the various embodiments of methods and devices for data driven role based security and related embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 12:
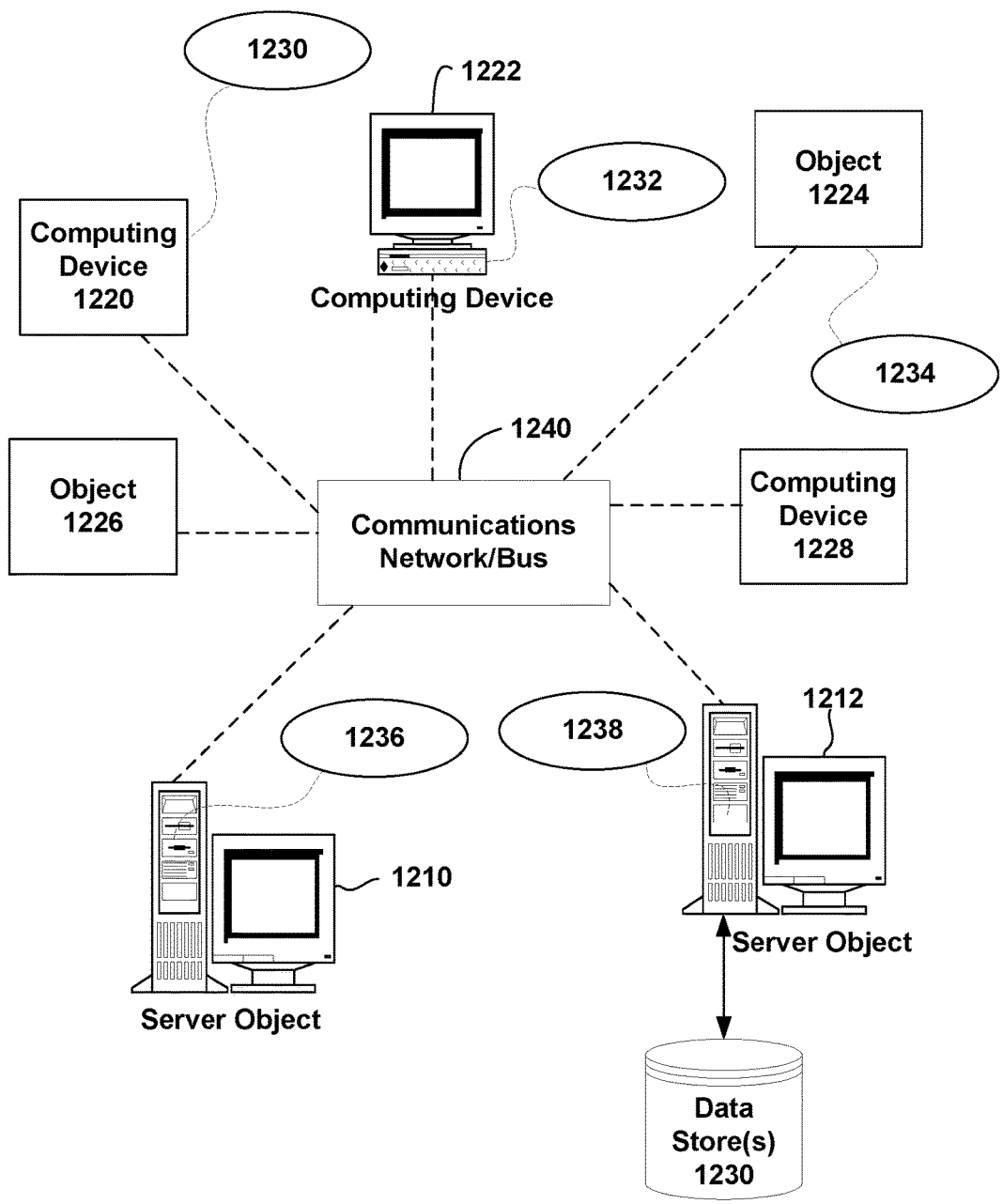
FIG. 12 is a block diagram representing exemplary non-limiting networked environments in which various embodiments described herein can be implemented.

FIG. 12 provides a non-limiting schematic diagram of an exemplary networked or distributed computing environment. The distributed computing environment comprises computing objects or devices 1210, 1212, etc. and computing objects or devices 1220, 1222, 1224, 1226, 1228, etc., which may include programs, methods, data stores, programmable logic, etc., as represented by applications 1230, 1232, 1234, 1236, 1238. It can be appreciated that computing objects or devices 1210, 1212, etc. and computing objects or devices 1220, 1222, 1224, 1226, 1228, etc. may comprise different devices, such as PDAs, audio/video devices, mobile phones, MP3 players, laptops, etc.

The computing objects or devices 1210, 1212, etc. and computing objects or devices 1220, 1222, 1224, 1226, 1228, etc. can communicate with one or more other computing objects or devices 1210, 1212, etc. and computing objects or devices 1220, 1222, 1224, 1226, 1228, etc. by way of the communications network 1240, either directly or indirectly. Even though illustrated as a single element in FIG. 12, network 1240 may comprise other computing objects and computing devices that provide services to the system of FIG. 12, and/or may represent multiple interconnected networks, which are not shown. The computing objects or devices 1210, 1212, etc. or the computing objects or devices 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of data driven role based security as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 12, as a non-limiting example, computing objects or devices 1220, 1222, 1224, 1226, 1228, etc. can be thought of as clients and computing objects or devices 1210, 1212, etc. can be thought of as servers where the servers provide data services, such as receiving data from clients, such as computing objects or devices 1220, 1222, 1224, 1226, 1228, etc., storing of data, processing of data, transmitting data to clients, such as computing objects or devices 1220, 1222, 1224, 1226, 1228, etc., although any computer can be considered a client, a server, or both, depending on the circumstances. Any of these computing devices may be processing data, or requesting services or tasks that may implicate data driven role based security and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 1240 is the Internet, for example, the computing objects or devices 1210, 1212, etc. can be Web servers with which the clients, such as computing objects or devices 1220, 1222, 1224, 1226, 1228, etc., communicate via any of a number of known protocols, such as HTTP. Servers, such as computing objects or devices 1210, 1212, etc., may also serve as clients, such as computing objects or devices 1220, 1222, 1224, 1226, 1228, etc., as may be characteristic of a distributed computing environment.

Exemplary Computing Device

As mentioned, various embodiments described herein apply to any device wherein it may be desirable to implement one or pieces of data driven role based security. It should be understood, therefore, that handheld, portable and other computing devices and computing objects of all kinds are contemplated for use in connection with the various embodiments described herein, i.e., anywhere that a device may provide some functionality in connection with data driven role based security. Accordingly, the below general purpose remote computer described below in FIG. 13 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer-executable instructions, such as program modules, being executed by one or more computers, such as client workstations, servers or other devices. Those skilled in the art will appreciate that network interactions may be practiced with a variety of computer system configurations and protocols.

Figure 13:
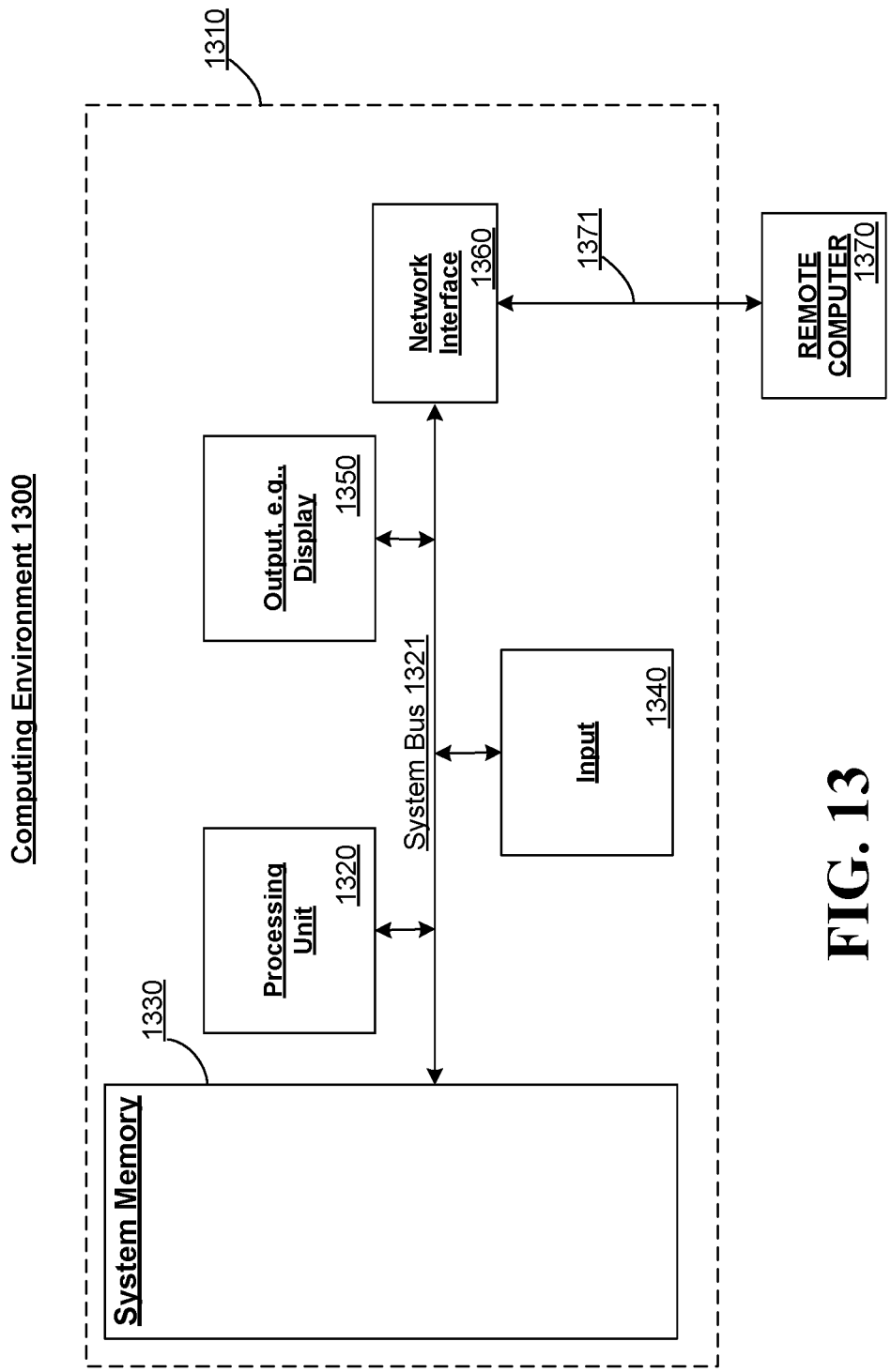
FIG. 13 is a block diagram representing an exemplary non-limiting computing system or operating environment in which one or more aspects of various embodiments described herein can be implemented.

FIG. 13 thus illustrates an example of a suitable computing system environment 1300 in which one or more of the embodiments may be implemented, although as made clear above, the computing system environment 1300 is only one example of a suitable computing environment and is not intended to suggest any limitation as to the scope of use or functionality of any of the embodiments. Neither should the computing environment 1300 be interpreted as having any dependency or requirement relating to any one or combination of components illustrated in the exemplary operating environment 1300.

With reference to FIG. 13, an exemplary remote device for implementing one or more embodiments herein can include a general purpose computing device in the form of a handheld computer 1310. Components of handheld computer 1310 may include, but are not limited to, a processing unit 1320, a system memory 1330, and a system bus 1321 that couples various system components including the system memory to the processing unit 1320.

Computer 1310 typically includes a variety of computer readable media, such as, but not limited to, digital versatile disks (DVDs), flash storage, internal or external hard drives, compact disks (CDs), etc., and can be any available media that can be accessed by computer 1310 including remote drives, cloud storage disks, etc. The system memory 1330 may include computer storage media in the form of volatile and/or nonvolatile memory such as read only memory (ROM) and/or random access memory (RAM). By way of example, and not limitation, memory 1330 may also include an operating system, application programs, other program modules, and program data.

A user may enter commands and information into the computer 1310 through input devices 1340 A monitor or other type of display device is also connected to the system bus 1321 via an interface, such as output interface 1350. In addition to a monitor, computers may also include other peripheral output devices such as speakers and a printer, which may be connected through output interface 1350.

The computer 1310 may operate in a networked or distributed environment using logical connections to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1371, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to publish, build applications for or consume data in connection with interactions with a cloud or network service.

There are multiple ways of implementing one or more of the embodiments described herein, e.g., an appropriate API, tool kit, driver code, operating system, control, standalone or downloadable software object, etc. which enables applications and services to use data driven role based security. Embodiments may be contemplated from the standpoint of an API (or other software object), as well as from a software or hardware object that facilitates provision data driven role based security in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with the preferred embodiments of the various figures, it is to be understood that other similar embodiments may be used or modifications and additions may be made to the described embodiment for performing the same function without deviating therefrom. Still further, one or more aspects of the above described embodiments may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A computer system comprising:
one or more hardware processors;
system memory coupled to the one or more hardware processors, the system memory storing instructions that are executable by the one or more hardware processors; and
the one or more hardware processors executing the instructions stored in the system memory to control performance of a requested user operation, including the following:
determine if the requested user operation can access data on behalf of a user based on user context associated with the user retrieved from an electronic data source, the user context identifying a location of an object representing the user relative to other objects within a hierarchical data structure, the hierarchical data structure organized at least in part based on an organizational structure of an organization;
use the user context to dynamically derive a role for the user, wherein dynamically deriving the role for the user includes using the user context to dynamically identify a direct report of the user;
access a control expression governing performance of the requested user operation for the derived role;
form a set of permissions for the user by evaluating the control expression using the user context and a data context for the data, the data context including information in addition to or other than the data, and wherein forming the set of permissions for the user includes evaluating a location of the data in the hierarchical data structure;
determine authorization of the user to perform the requested user operation from the set of permissions; and
perform the requested user operation according to the determined authorization of the user.

2. The computer system of claim 1, further comprising the one or more hardware processors executing the instructions to, prior to forming the set of permissions, determine that the derived role is granted permission to access the data; and
wherein the one or more hardware processors executing the instructions to determine authorization of the user to perform the requested user operation comprises the one or more hardware processors executing the instructions to determine if the granted permission is to be honored at runtime.

3. The computer system of claim 1, wherein the one or more hardware processors executing the instructions to use the user context to derive the role for the user comprises the one or more hardware processors executing the instructions to use the location of the object within the hierarchical data structure to derive the role for the user.

4. The computer system of claim 1, wherein the one or more hardware processors executing the instructions to use the user context to derive the role for the user comprises the one or more hardware processors executing the instructions to use one or more attributes included in the object to derive the role for the user.

5. The computer system of claim 1, wherein the one or more hardware processors executing the instructions to determine if the requested user operation can access data on behalf of a user comprises the one or more hardware processors executing the instructions to determine if the requested user operation can access data on behalf of the user, the requested user operation selected from among: editing the data, viewing the data, printing the data, or distributing the data.

6. The computer system of claim 1, wherein the one or more hardware processors executing the instructions to determine if the requested user operation can access data on behalf of a user comprises the one or more hardware processors executing the instructions to determine if the requested user operation can access data included in a file system object on behalf of the user.

7. The computer system of claim 1, wherein the one or more hardware processors executing the instructions to form the set of permissions by evaluating the control expression comprises the one or more hardware processors executing the instructions to form a list of roles that are authorized to access the data.

8. The computer system of claim 1, wherein the data context identifies the location of the data relative to other objects within the hierarchical data structure, and wherein the one or more hardware processors executing the instructions to form a set of permissions by evaluating the control expression comprises the one or more hardware processors executing the instructions to form a set of permissions by evaluating the location of the object in the hierarchical data structure relative to the location of the data in the hierarchical data structure.

9. The computer system of claim 1, wherein the one or more hardware processors executing the instructions to form a set of permissions for the user by evaluating the control expression comprises the one or more hardware processors executing the instructions to form a set of permissions that augment a static set of permissions, the static set of permissions also used for determining if requested user operations can access the data; and wherein the one or more hardware processors executing the instructions to determine the authorization of the user to perform the requested user operation comprises the one or more hardware processors executing the instructions to determine the authorization of the user to perform the requested user operation from the set of permissions and from the static set of permissions.

10. The computer system of claim 1, wherein the one or more hardware processors executing the instructions to determine the authorization of the user to perform the requested user operation from the set of permissions comprises the one or more hardware processors executing the instructions to determine that the requested user operation is denied from accessing the data.

11. The computer system of claim 1, further comprising the one or more hardware processors executing the instructions to obtain the user context during a user login by the user.

12. A method for use at a computer system for controlling performance of a requested user operation, the method comprising:

determining if the requested user operation can access data on behalf of a user based on user context associated with the user retrieved from an electronic data source, the user context identifying a location of an object representing the user relative to other objects within a hierarchical data structure, the hierarchical data structure organized at least in part based on an organizational structure of an organization;

using the user context to dynamically derive a role for the user, wherein dynamically deriving the role for the user includes using the user context to dynamically identify a direct report of the user;

accessing a control expression governing performance of the requested user operation for the derived role;

forming a set of permissions for the user by evaluating the control expression using the user context and a data context for the data, the data context including information in addition to or other than the data, and wherein forming the set of permissions for the user includes evaluating a location of the data in the hierarchical data structure;

determining authorization of the user to perform the requested user operation from the set of permissions; and performing the requested user operation according to the determined authorization of the user.

13. The method of claim 12, further comprising determining that the derived role has a permission grant to access the data prior to evaluating the control expression; and wherein determining the authorization of the user to perform the requested user operation comprises determining if the permission grant is to be honored at runtime.

14. The method of claim 12, further comprising, prior to forming the set of permissions, determining that the derived role is granted permission to access the data; and wherein determining the authorization of the user to perform the requested user operation comprises determining if the granted permission is to be honored at runtime.

15. The method of claim 12, wherein using the user context to derive the role for the user comprises using the location of the object within the hierarchical data structure to derive the role for the user.

16. The method of claim 12, wherein using the user context to derive the role for the user comprises using one or more attributes included in the object to derive the role for the user.

17. The method of claim 12, wherein determining if the requested user operation can access data on behalf of the user comprises determining if the requested user operation can access data on behalf of the user, the requested user operation selected from among: editing the data, viewing the data, printing the data, or distributing the data.

18. The method of claim 12, wherein determining if the requested user operation can access data on behalf of the user comprises determining if the requested user operation can access data included in a file system object on behalf of the user.

19. The method of claim 12, wherein forming the set of permissions by evaluating the control expression comprises forming a list of roles that are authorized to access the data.

20. The method of claim 12, wherein the data context identifies the location of the data relative to other objects within the hierarchical data structure, and wherein forming the set of permissions by evaluating the control expression comprises forming the set of permissions by evaluating the location of the object in the hierarchical data structure relative to the location of the data in the hierarchical data structure.

21. The method of claim 12, wherein forming a set of permissions for the user by evaluating the control expression comprises forming a set of permissions that augment a static set of permissions, the static set of permissions also used for determining if requested user operations can access the data; and wherein determining the authorization of the user to perform the requested user operation comprises determining the authorization of the user to perform the requested user operation from the set of permissions and from the static set of permissions.

22. The method of claim 12, wherein determining the authorization of the user to perform the requested user operation from the set of permissions comprises determining that the requested user operation is denied from accessing the data.

23. The method of claim 12, further comprising obtaining the user context during a user login by the user.

24. A computer-implemented data access system, comprising:
one or more hardware processors;
system memory coupled to the one or more hardware processors, the system memory storing instructions that are executable by the one or more hardware processors;
the one or more hardware processors executing the instructions stored in the system memory to retrieve from an electronic data source a user context associated with a user, the user context identifying a location of an object representing the user relative to other objects within a hierarchical data structure, the hierarchical data structure organized at least in part based on an organizational structure of an organization;
the one or more hardware processors executing the instructions stored in the system memory to dynamically derive a role for the user from the user context, wherein dynamically deriving the role for the user includes using the user context to dynamically identify a direct report of the user;
means for using the user context along with a data context for data to determine authorization of the user to perform a requested operation to access the data based on the derived role, the data context including information in addition to or other than the data, and wherein forming a set of permissions for the user includes evaluating a location of the data in the hierarchical data structure; and
the one or more hardware processors executing the instructions stored in the system memory to perform the requested operation according to the determined authorization of the user.

25. The computer-implemented data access system of claim 24, wherein the one or more hardware processors executing the instructions to derive the role for the user from the user context comprises the one or more hardware processors executing the instructions to derive the role for the user from the location of the object within the hierarchical data structure to derive the role for the user.

26. The computer-implemented data access system of claim 24, wherein the one or more hardware processors executing the instructions to derive the role for the user from the user context comprises the one or more hardware processors executing the instructions to derive the role for the user from one or more attributes included in the object.

27. The computer-implemented data access system of claim 24, wherein the one or more hardware processors executing the instructions to perform the requested operation according to the determined authorization of the user comprises the one or more hardware processors executing the instructions to deny the user access to the data.

28. The computer-implemented data access system of claim 24, wherein the one or more hardware processors executing the instructions to obtain the user context associated with the user comprises the one or more hardware processors executing the instructions to obtain the user context during a user login by the user.

* * * * *